US012776328B2

(12) United States Patent
Kim et al.

(10) Patent No.: US 12,776,328 B2
(45) Date of Patent: Oct. 27, 2026

(54) ELECTRONIC DEVICE, METHOD, AND NON-TRANSITORY COMPUTER READABLE STORAGE DEVICE ADAPTIVELY PROCESSING AUDIO BITSTREAM BY CONDITIONALLY EXECUTING BANDWIDTH EXTENSION

(71) Applicant: SAMSUNG ELECTRONICS CO., LTD., Suwon-si (KR)

(72) Inventors: Hyunwook Kim, Suwon-si (KR); Kyoungho Bang, Suwon-si (KR); Hangil Moon, Suwon-si (KR); Jaeha Park, Suwon-si (KR); Hyunchul Yang, Suwon-si (KR); Seung Heo, Suwon-si (KR)

(73) Assignee: SAMSUNG ELECTRONICS CO., LTD., Gyeonggi-Do (KR)

(*) Notice: Subject to any disclaimer, the term of this patent is extended or adjusted under 35 U.S.C. 154(b) by 148 days.

(21) Appl. No.: 18/483,506

(22) Filed: Oct. 9, 2023

(65) Prior Publication Data

US 2024/0127835 A1 Apr. 18, 2024

Related U.S. Application Data

(63) Continuation of application No. PCT/KR2023/014005, filed on Sep. 15, 2023.

(30) Foreign Application Priority Data

Oct. 12, 2022 (KR) ........................ 10-2022-0131000
Nov. 2, 2022 (KR) ........................ 10-2022-0144822

(51) Int. Cl.
*G10L 19/02* (2013.01)
*G10L 19/032* (2013.01)
*G10L 21/038* (2013.01)

(52) U.S. Cl.
CPC ........ *G10L 19/0204* (2013.01); *G10L 19/032* (2013.01); *G10L 21/038* (2013.01)

(58) Field of Classification Search
CPC .......................... G10L 19/0204; G10L 21/038
See application file for complete search history.

(56) References Cited

U.S. PATENT DOCUMENTS 8,910,229 B2 12/2014 Xu et al.
8,959,015 B2 * 2/2015 Lee ........................ G10L 19/20
704/200

(Continued)

FOREIGN PATENT DOCUMENTS

KR 100923301 B1 10/2009
KR 20140005358 A 1/2014

(Continued)

OTHER PUBLICATIONS

International Search Report mailed Dec. 27, 2023 for PCT/KR2023/014005.

(Continued)

*Primary Examiner* — Shaun Roberts
(74) *Attorney, Agent, or Firm* — CANTOR COLBURN LLP

(57) ABSTRACT

An electronic device includes a communication circuit, a speaker, and a processor. The processor is configured to identify a bitrate of a first audio bitstream received via the communication circuit from an external electronic device. The processor is configured to obtain, in response to the bitrate lower than a reference value, an audio signal by executing a bandwidth extension (BWE) for the first audio bitstream based on at least one coding parameter obtained from a second audio bitstream previously received via the communication circuit from the external electronic device before the first audio bitstream. The processor is configured to obtain, in response to the bitrate higher than or equal to (Continued)

the reference value, the audio signal for the first audio bitstream without executing the BWE. The processor is configured to output, based on the audio signal, audio via the speaker.

20 Claims, 9 Drawing Sheets

(56) References Cited

U.S. PATENT DOCUMENTS

| | | | | |
|---|---|---|---|---|
| 9,293,143 | B2 | 3/2016 | Villette et al. | |
| 9,313,334 | B2 * | 4/2016 | Grancharov | H04N 7/152 |
| 9,646,624 | B2 | 5/2017 | Disch et al. | |
| 9,672,835 | B2 | 6/2017 | Gao | |
| 9,984,692 | B2 | 5/2018 | Fejzo | |
| 10,002,617 | B2 | 6/2018 | Näslund et al. | |
| 10,249,313 | B2 | 4/2019 | Gao | |
| 11,127,409 | B2 | 9/2021 | Qi et al. | |
| 11,545,162 | B2 | 1/2023 | Sung et al. | |
| 2002/0097807 | A1 | 7/2002 | Gerrits | |
| 2007/0150269 | A1 * | 6/2007 | Nongpiur | G10L 21/0364 704/226 |
| 2008/0126082 | A1 | 5/2008 | Ehara et al. | |
| 2009/0141790 | A1 * | 6/2009 | Kawashima | G10L 19/005 375/240 |
| 2010/0063806 | A1 * | 3/2010 | Gao | G10L 19/22 704/E21.001 |
| 2010/0286805 | A1 * | 11/2010 | Gao | G10L 19/005 700/94 |
| 2011/0200198 | A1 * | 8/2011 | Grill | G10L 19/18 381/23 |
| 2014/0149126 | A1 * | 5/2014 | Soulodre | G10L 21/038 704/500 |
| 2015/0332702 | A1 * | 11/2015 | Disch | G10L 19/24 704/500 |
| 2016/0180854 | A1 * | 6/2016 | Lecomte | G10L 19/0204 704/205 |
| 2017/0013503 | A1 * | 1/2017 | Lee | H04W 28/0289 |
| 2018/0075856 | A1 | 3/2018 | Salami et al. | |
| 2020/0029081 | A1 | 1/2020 | Good | |
| 2020/0234720 | A1 * | 7/2020 | Sung | G10L 21/038 |
| 2022/0122621 | A1 | 4/2022 | Bouthéon et al. | |

FOREIGN PATENT DOCUMENTS

| | | | |
|---|---|---|---|
| KR | 20150042191 | A | 4/2015 |
| KR | 20150114979 | A | 10/2015 |
| KR | 20160096119 | A | 8/2016 |
| KR | 20160129876 | A | 11/2016 |
| KR | 101740219 | B1 | 5/2017 |
| KR | 101771828 | B1 | 8/2017 |
| KR | 101871644 | B1 | 6/2018 |
| KR | 20200062183 | A | 6/2020 |
| KR | 20220025108 | A | 3/2022 |

OTHER PUBLICATIONS

3rd Generation Partnership Project; Technical Specification Group Services and System Aspects; Codec for Enhanced Voice Services (EVS); Detailed Algorithmic Description (Release 13), 3GPP TS 26.445 V13.4.1, Mar. 2017, 24 pages.

The extended European search report for EP Application No. 23877525.8 mailed on Jun. 30, 2025.

* cited by examiner

ELECTRONIC DEVICE, METHOD, AND NON-TRANSITORY COMPUTER READABLE STORAGE DEVICE ADAPTIVELY PROCESSING AUDIO BITSTREAM BY CONDITIONALLY EXECUTING BANDWIDTH EXTENSION

CROSS-REFERENCE TO RELATED APPLICATION(S)

This application is a continuation application, claiming priority under § 365(c), of an International application No. PCT/KR2023/014005, filed on Sep. 15, 2023, which is based on and claims the benefit of a Korean patent application number 10-2022-0131000, filed on Oct. 12, 2022, in the Korean Intellectual Property Office, and of a Korean patent application number 10-2022-0144822, filed on Nov. 2, 2022, in the Korean Intellectual Property Office, the disclosure of each of which is incorporated by reference herein in its entirety.

TECHNICAL FIELD

The following descriptions relate to an electronic device, a method, and a non-transitory computer-readable storage device adaptively processing audio bitstream.

BACKGROUND ART

An audio compression encoder and decoder (CODEC) may indicate a software that provides a function of an encoder converting a digital audio signal into a compressed audio bitstream and a decoder converting a compressed audio bitstream into a digital audio signal. For example, the codec can be used to obtain an audio signal (e.g., an audio pulse code modulation (PCM) signal) from an audio bitstream.

The above-described information may be provided as related art for the purpose of helping to understand the present disclosure. No claim or determination is raised as to whether any of the above-described information can be applied as a prior art related to the present disclosure.

DISCLOSURE

Technical Solution

An electronic device is provided. The electronic device may include a communication circuit. The electronic device may include a speaker. The electronic device may include a processor. The processor may be configured to identify a bitrate of a first audio bitstream received via the communication circuit from an external electronic device. The processor may be configured to obtain, in response to the bitrate lower than a reference value, an audio signal based on executing a bandwidth extension (BWE) for the first audio bitstream based at least in part on at least one coding parameter obtained from a second audio bitstream that has been received via the communication circuit from the external electronic device before the first audio bitstream. The processor may be configured to obtain, in response to the bitrate higher than or equal to the reference value, obtain the audio signal based on bypassing to execute the BWE. The processor may be configured to output, based on the audio signal, audio via the speaker.

A method is provided. The method may be executed in an electronic device including a speaker and a communication circuit. The method may comprise identifying a bitrate of a first audio bitstream received via the communication circuit from an external electronic device. The method may comprise obtaining, in response to the bitrate lower than a reference value, an audio signal based on executing a bandwidth extension (BWE) for the first audio bitstream based at least in part on at least one coding parameter obtained from a second audio bitstream that has been received via the communication circuit from the external electronic device before the first audio bitstream. The method may comprise obtaining, in response to the bitrate higher than or equal to the reference value, obtain the audio signal based on bypassing to execute the BWE. The method may comprise outputting, based on the audio signal, audio via the speaker.

A non-transitory computer-readable storage device is provided. The non-transitory computer-readable storage device may store one or more programs. The one or more programs may comprise instructions which, when executed by a processor of an electronic device including a speaker and a communication circuit, cause the electronic device to identify a bitrate of a first audio bitstream received via the communication circuit from an external electronic device. The one or more programs may comprise instructions which, when executed by the processor, cause the electronic device to obtain, in response to the bitrate lower than a reference value, an audio signal based on executing a bandwidth extension (BWE) for the first audio bitstream based at least in part on at least one coding parameter obtained from a second audio bitstream that has been received via the communication circuit from the external electronic device before the first audio bitstream. The one or more programs may comprise instructions which, when executed by the processor, cause the electronic device to obtain, in response to the bitrate higher than or equal to the reference value, obtain the audio signal based on bypassing to execute the BWE. The one or more programs may comprise instructions which, when executed by the processor, cause the electronic device to output, based on the audio signal, audio via the speaker.

DETAILED DESCRIPTION

Figure 1:
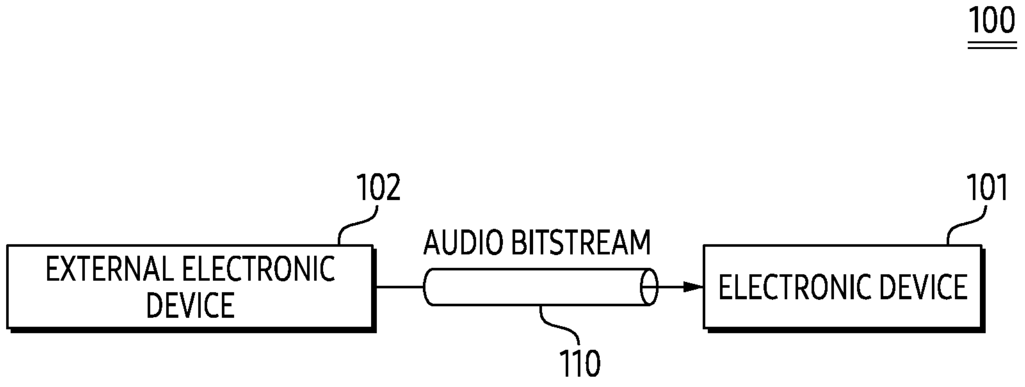
FIG. 1 illustrates an example of an environment including an exemplary electronic device and an external electronic device.

FIG. 1 illustrates an example of an environment including an exemplary electronic device and an external electronic device.

Referring to FIG. 1, the environment 100 may include an electronic device 101 and an external electronic device 102.

The electronic device 101 may communicate with the external electronic device 102 to provide an audio service. For example, the electronic device 101 may receive a signal, data, information, and/or a packet for the audio service from external electronic device 102, or may transmit a signal, data, information, and/or a packet to external electronic device 102. For example, the signal, the data, the information, and/or the packet may be provided from the electronic device 101 to the external electronic device 102, or from the external electronic device 102 to the electronic device 101, through a channel 110 (or a link 110) between the electronic device 101 and the external electronic device 102.

For example, the external electronic device 102 may perform coding (or encoding) an audio signal to provide the audio service. For example, the coding may be executed for compression.

For example, the external electronic device 102 may obtain an audio bitstream based on the coding. For example, the external electronic device 102 may obtain the audio bitstream based on executing the coding based on a bitrate corresponding to a quality (or state) of the channel 110. For example, on a condition that a value indicating a quality of the channel 110 is a first value, the external electronic device 102 may obtain the audio bitstream by executing the coding based on a first bitrate corresponding to the first value. For example, on a condition that the value is a second value higher than the first value, the external electronic device 102 may obtain the audio bitstream by executing the coding based on a second bitrate corresponding to the second value. For example, the second bitrate may be higher than the first bitrate. For example, on a condition that the value is higher than or equal to a threshold value, the external electronic device 102 may obtain the audio bitstream by executing the coding based on a bitrate higher than or equal to a reference value. For example, on a condition that the value is lower than the threshold value, the external electronic device 102 may obtain the audio bitstream by executing the coding based on the bitrate lower than the reference value.

For example, on a condition that the bitrate is higher than or equal to the reference value, the external electronic device 102 may obtain the audio bitstream based on executing the coding on an audio signal in a third frequency range including a first frequency range lower than the reference frequency and a second frequency range higher than or equal to the reference frequency. Here, the audio signal may span over the first frequency range and the second frequency range. For example, on a condition that the bitrate is lower than the reference value, the external electronic device 102 may obtain the audio bitstream based on executing the coding on an audio signal on the first frequency range among the first frequency range and the second frequency range. For example, since an audio signal on the first frequency range lower than the reference frequency is recognized better than an audio signal on the second frequency range higher than or equal to the reference frequency, the external electronic device 102 may exclude the audio signal on the second frequency range from the audio signal on the third frequency range and obtain the audio bitstream based on executing the coding on an audio signal on the first frequency range, when the bitrate is lower than the reference value. For example, when the bitrate is lower than the reference value, the external electronic device 102 may obtain the audio bitstream based on executing the coding for the audio signal on the first frequency range among the first frequency range and the second frequency range.

For example, the external electronic device 102 may transmit the audio bitstream to the electronic device 101 through the channel 110. The electronic device 101 may receive the audio bitstream from the external electronic device 102 through the channel 110.

For example, the electronic device 101 may perform decoding the audio bitstream. For example, the decoding may be performed for decompression.

For example, the electronic device 101 may obtain an audio pulse code modulation (PCM) signal based on the decoding. For example, on a condition that the audio bitstream was coded a bitrate higher than or equal to the reference value, a signal on a frequency domain transformed from the audio PCM signal may be formed on the third frequency range. For example, on a condition that the audio bitstream was coded to a bitrate lower than the reference value, the signal on the frequency domain may be formed on the first frequency range.

For example, the external electronic device 102 may transmit an audio bitstream coded based on a bitrate higher than or equal to the reference value and another audio bitstream coded based on a bitrate lower that the reference value to the electronic device 101, according to a change in a quality of the channel 110. For example, the electronic device 101 may obtain an audio PCM signal in a first frame and an audio PCM signal in a second frame next to the first frame, based on decoding each of the audio bitstream and the other audio bitstream. For example, the audio PCM signal in the first frame may include frequency components within both the first frequency range and the second frequency range, but the audio PCM signal in the second frame may include frequency components within the first frequency range among the first frequency range and the second frequency range. For example, the audio PCM signal in the second frame may not include frequency components in the second frequency range, unlike the audio PCM signal in the first frame. For example, when an audio is outputted based on the audio PCM signal in the second frame after an audio is outputted based on the audio PCM signal in the first frame, a quality of an audio service may be reduced due to the presence or absence of frequency components within the second frequency range.

For example, the electronic device 101 may include frequency components within the second frequency range in the audio PCM signal in the second frame, by executing a bandwidth extension (BWE) for the other audio bitstream among the audio bitstream and the other audio bitstream. For example, the electronic device 101 may adaptively execute the BWE according to the bitrate of the audio bitstream. For example, the electronic device 101 may provide an enhanced audio service through the adaptive execution of the BWE.

Figure 2:
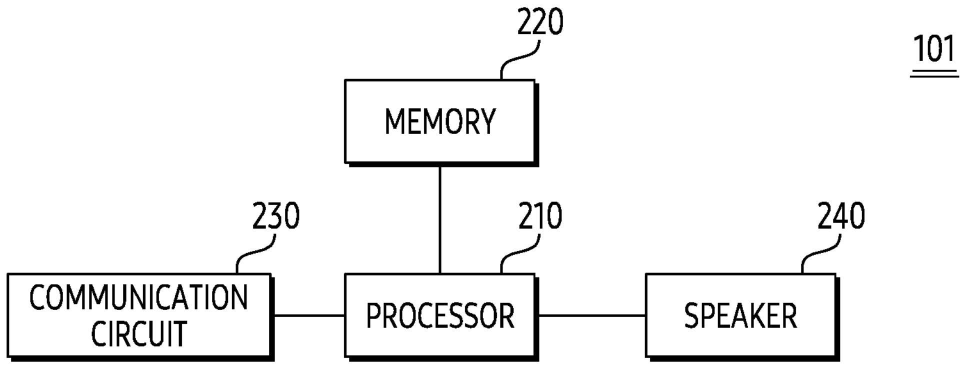
FIG. 2 is a simplified block diagram of an exemplary electronic device.

FIG. 2 is a simplified block diagram of an exemplary electronic device. The electronic device 101 in FIG. 2 may include the electronic device 101 illustrated in FIG. 1.

Referring to FIG. 2, the electronic device 101 may include a processor 210, a memory 220, and a communication circuit 230. For example, the electronic device 101 may further include a speaker 240.

Figure 8:
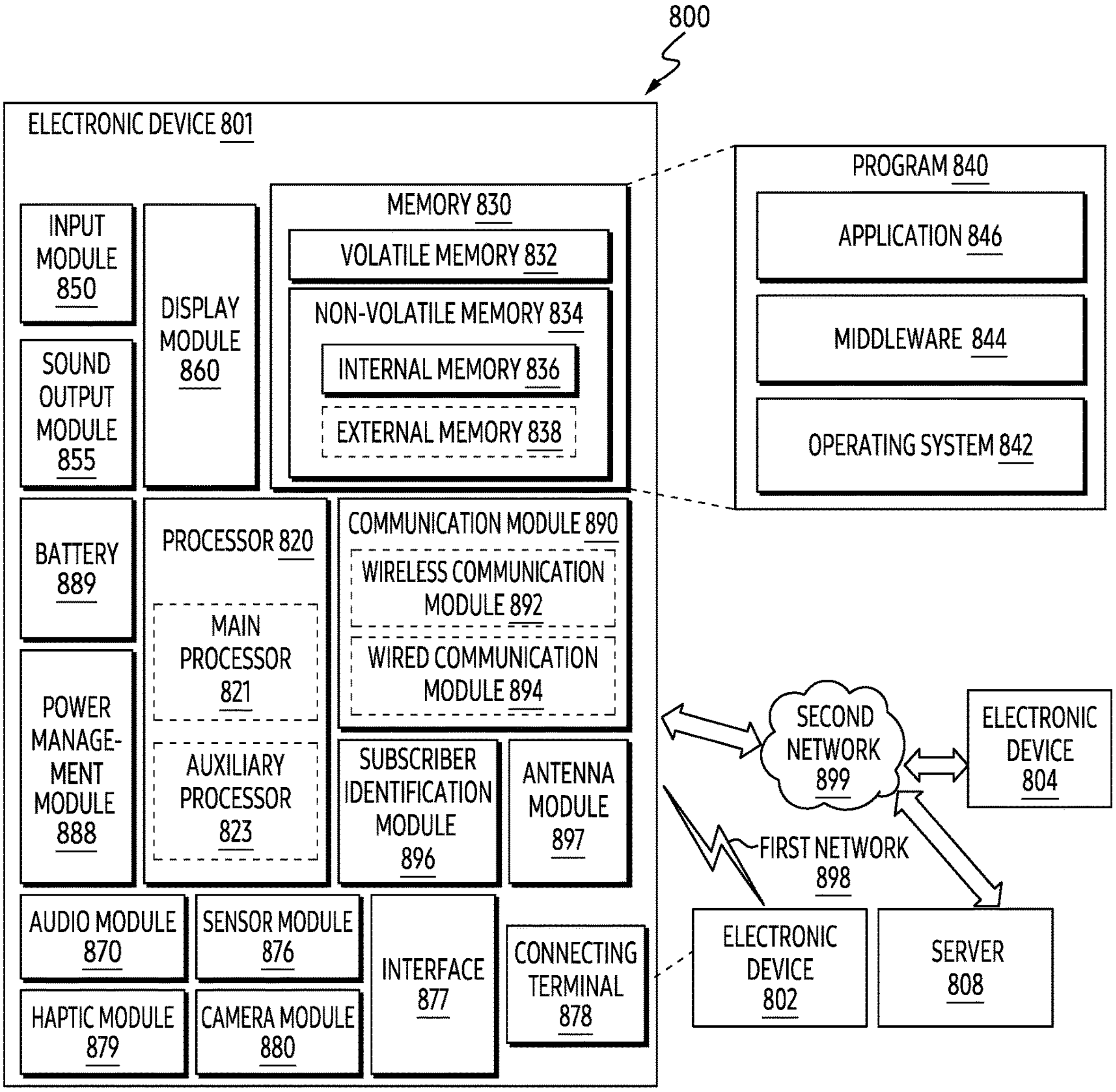
FIG. 8 is a block diagram of an electronic device in a network environment, according to various embodiments.

For example, the processor 210 may include at least a part of a processor 820 of FIG. 8. For example, the memory 220 may include at least a part of a memory 830 of FIG. 8. For example, the communication circuit 230 may include at least a part of a communication module 890 of FIG. 8. For example, the speaker 240 may include at least a part of a sound output module 855 of FIG. 8.

For example, the processor 210 may be operably coupled with the memory 220, the communication circuit 230, and/or the speaker 240. For example, operably coupling the processor 210 with each of the memory 220, the communication circuit 230, and the speaker 240 may indicate directly connecting each of the processor 210 with the memory 220, the communication circuit 230, and the speaker 240. For example, operably coupling the processor 210 with each of the memory 220, the communication circuit 230, and the speaker 240 may indicate connecting the processor 210 with each of the memory 220, the communication circuit 230, and the speaker 240 through other components of the electronic device 101. For example, operably coupling the processor 210 with each of the memory 220, the communication circuit 230, and the speaker 240 may indicate that each of the memory 220, the communication circuit 230, and the speaker 240 operates based on instructions executed by the processor 210. For example, operably coupling the processor 210 with each of the memory 220, the communication circuit 230, and the speaker 240 may indicate that each of the memory 220, the communication circuit 230, and the speaker 240 is controlled by the processor 210.

Figure 9:
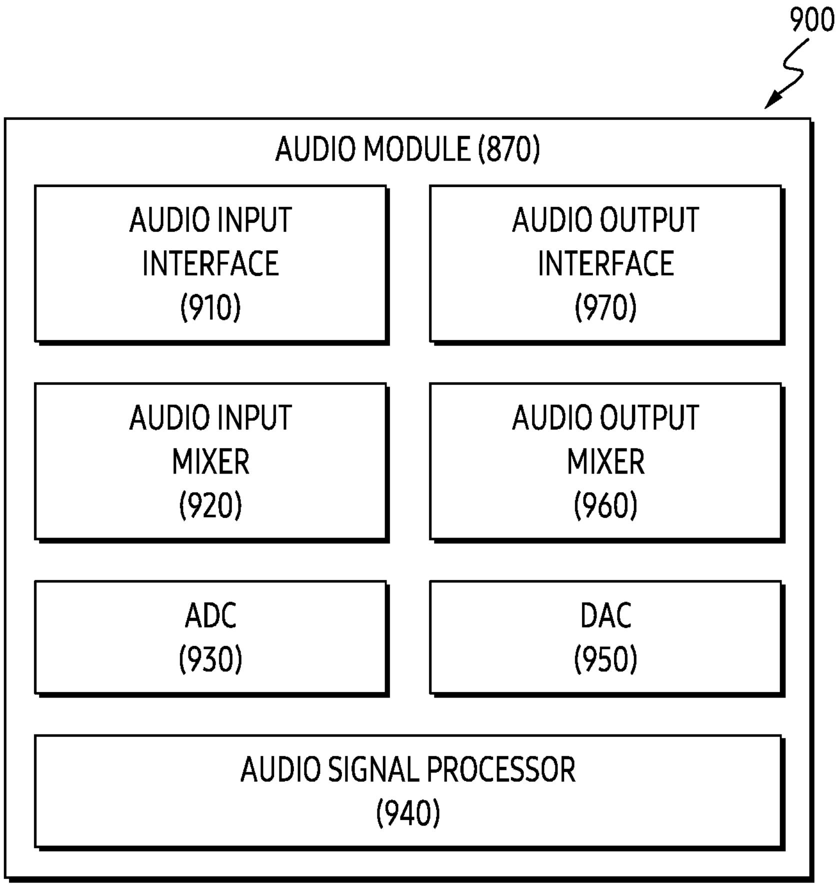
FIG. 9 is a block diagram of an audio module, according to various embodiments.

Although not illustrated in FIG. 2, the electronic device 101 may further include at least a part of the audio module 870 of FIG. 8 and/or FIG. 9 (or at least a part of the audio processing circuit).

Figure 3:
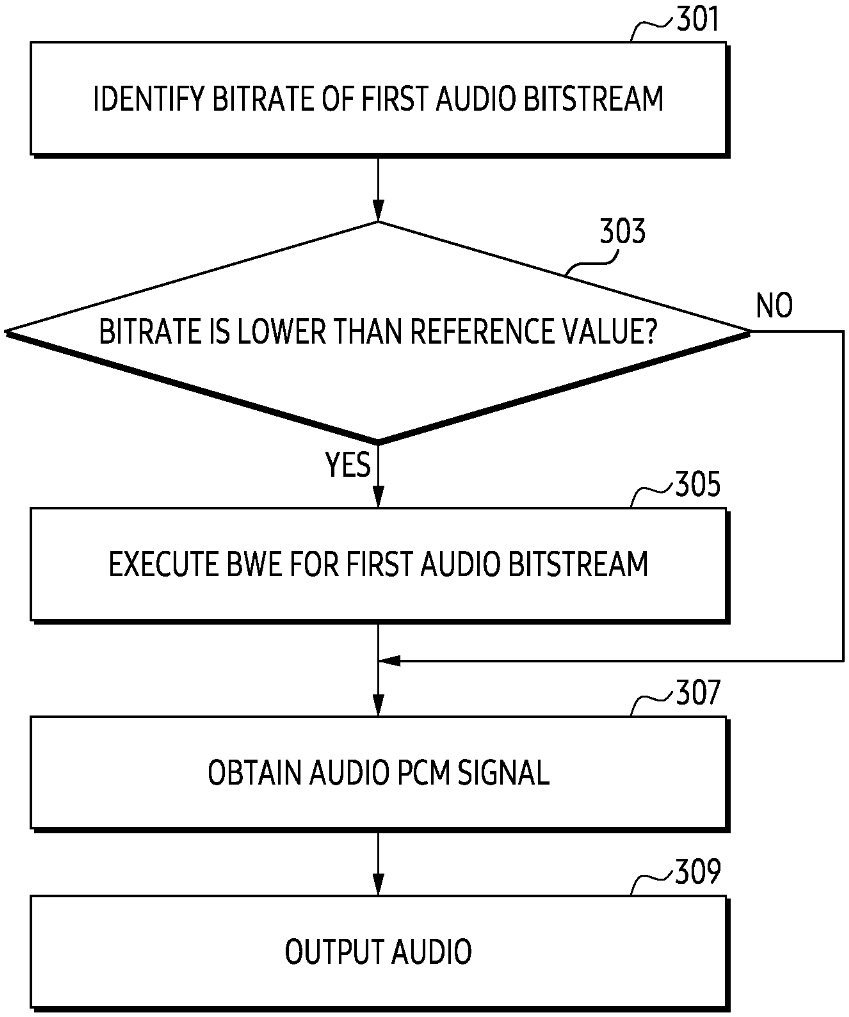
FIG. 3 is a flowchart illustrating a method of adaptively executing a bandwidth extension (BWE) according to a bitrate.

FIG. 3 is a flowchart illustrating a method of adaptively executing a bandwidth extension (BWE) according to a bitrate. The method may be executed by the processor 210 illustrated in FIG. 2.

Referring to FIG. 3, in operation 301, the processor 210 may identify a bitrate of a first audio bitstream received through the communication circuit 230 from the external electronic device 102. For example, the processor 210 may identify at least one coding parameter including the bitrate based on parsing the first audio bitstream. However, it is not limited thereto.

In operation 303, the processor 210 may identify whether the bitrate is lower than the reference value illustrated through the description of FIG. 1. For example, the processor 210 may execute operation 305 in response to the bitrate lower than the reference value. For example, the processor 210 may bypass operation 305 and execute operation 307, in response to the bitrate higher than or equal to the reference value.

In operation 305, on a condition that the bitrate is lower than the reference value, the processor 210 may execute the BWE for the first audio bitstream, based at least in a part on one coding parameter obtained from the second audio bitstream that has received through the communication circuit 230 from the external electronic device 102 before the first audio bitstream. For example, since a fact that the bitrate is lower than the reference value indicates that the first audio bitstream is a bitstream obtained based on coding a signal on the first frequency range among the first frequency range and the second frequency range illustrated in the description of FIG. 1, the processor 210 may execute the BWE for the first audio bitstream.

For example, the BWE may be executed based on at least one coding parameter obtained from the second audio bitstream. For example, unlike the first audio bitstream, the second audio bitstream may be a bitstream obtained based on coding a signal on the third frequency range including the first frequency range and the second frequency range. For example, the bitrate of the second audio bitstream may be higher than or equal to the reference value.

For example, the processor 210 may obtain the at least one coding parameter by parsing the second audio bitstream. The processor 210 may transform (or convert) the at least one coding parameter into (or to) at least one parameter for the BWE. For example, the at least one parameter for the BWE may be transformed from the at least one coding parameter, by using a model trained through machine learning (ML) based on the at least one coding parameter of at least one audio bitstream that has received before the second audio bitstream. However, it is not limited thereto. For example, the processor 210 may store the at least one parameter for the BWE in the parameter history DB (See FIGS. 6 and 7). For example, the at least one parameter for the BWE may be updated or refined through the trained model. For example, the processor 210 may execute the BWE for the first audio bitstream, based on the at least one parameter for the BWE, in response to the bitrate lower than the reference value.

For example, the at least one coding parameter may include energy information for each of frequency bands that has obtained when the second audio bitstream was coded. For example, each of the frequency bands may be a frequency band included within the third frequency range. For example, the at least one coding parameter obtained from the second audio bitstream may include information on a signal that has a strength greater than or equal to the reference strength within a predetermined time interval (e.g., a frame) and has been obtained when the second audio bitstream was coded. For example, the signal may be referred to as a transient signal. For example, the at least one coding parameter may include pitch information and/or harmonic overtone information that has been obtained when the second audio bitstream was coded. However, it is not limited thereto. The BWE executed based on the at least one coding parameter will be illustrated with the description of FIG. 4.

For example, the processor 210 may obtain a signal on a frequency domain by performing an inverse quantization on the first audio bitstream, and execute the BWE with respect to the signal on the frequency domain by using the at least one coding parameter (or at least one parameter for the BWE).

In operation 307, the processor 210 may obtain an audio PCM signal. The audio PCM signal may be an example of an audio signal or a digital audio signal.

For example, the audio PCM signal may be obtained based on executing the BWE in operation 305 according to the bitrate of the first audio bitstream lower than the reference value. For example, the processor 210 may obtain the audio PCM signal by executing an inverse transform for a signal on the frequency domain obtained through the BWE.

For example, the audio PCM signal may be obtained based on bypassing operation 305 according to the bitrate of the first audio bitstream higher than or equal to the reference value. For example, since a fact that the bitrate is higher than or equal to the reference value indicates that the first audio bitstream is a bitstream obtained based on coding a signal on the third frequency range including the first and second frequency ranges, the processor 210 may obtain the audio PCM signal based on bypassing operation 305 to include frequency components within the second frequency range. For example, the processor 210 may obtain the audio PCM signal based on decoding the first audio bitstream.

In operation 309, the processor 210 may output an audio through the speaker 240 based on the audio PCM signal.

As described above, on a conditions that the bitrate of the first audio bitstream is lower than the reference value, the electronic device 101 may obtain the audio PCM signal based on executing the BWE for the first audio bitstream. For example, since the BWE is executed based on at least one coding parameter of the second audio bitstream received before the first audio bitstream, the electronic device 101 may obtain the audio PCM signal including frequency components within the second frequency range even when the bitrate of the first audio bitstream is lower than the reference value. For example, the electronic device 101 may provide an enhanced audio service. For example, unlike a blind BWE that is executed by using only a signal in a low frequency range (e.g., the first frequency range), since the BWE is executed by using at least one codec parameter of a past audio bitstream (e.g., the second audio bitstream), the electronic device 101 may provide an enhanced audio service. For example, unlike a guided BWE that is executed based on guide information obtained through coding, since the BWE is executed by using at least one codec parameter of the past audio bitstream (e.g., the second audio bitstream), the electronic device 101 may provide an enhanced audio service without additional guide information.

Figure 4:
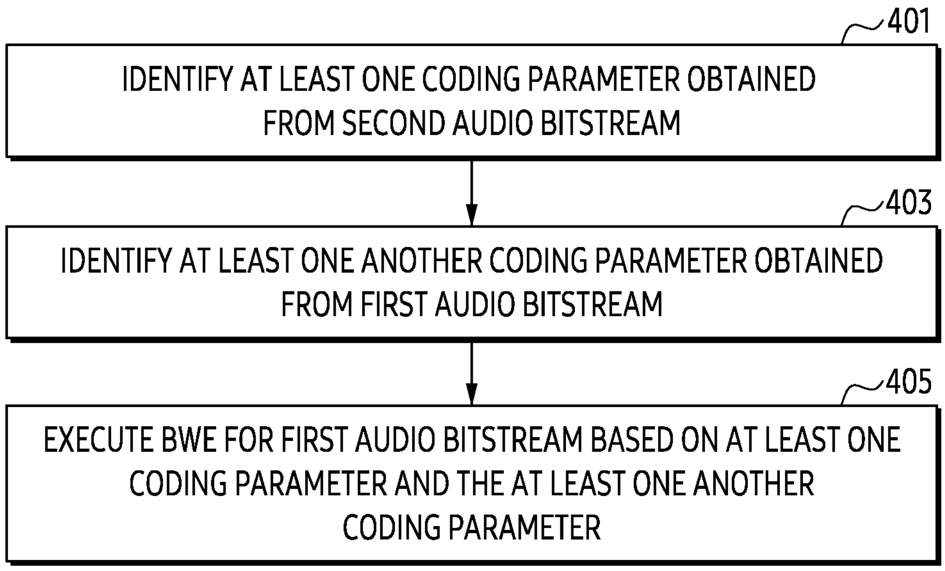
FIG. 4 is a flowchart illustrating a method of executing a BWE based on at least one coding parameter obtained from a second audio bitstream.

FIG. 4 is a flowchart illustrating a method of executing a BWE based on at least one coding parameter obtained from a second audio bitstream. The method may be executed by the processor 210 illustrated in FIG. 2.

Operations 401 to 405 of FIG. 4 may be included in operation 305 of FIG. 3. However, it is not limited thereto. For example, operations 401 to 405 may be executed independently of operation 305 of FIG. 3.

Referring to FIG. 4, in operation 401, the processor 210 may identify at least one coding parameter (or at least one parameter for the BWE) obtained from the second audio bitstream based on the bitrate of the first audio bitstream lower than the reference value. For example, the processor 210 may identify coding parameters obtained from a plurality of bitstreams that includes the second audio bitstream and was received before the first audio bitstream. For example, a weight applied to a part of the coding parameters for the BWE may be different from a weight applied to another part of the coding parameters for the BWE. However, it is not limited thereto.

For example, the at least one coding parameter may include energy information for each of the frequency bands that has been obtained when the second audio bitstream was coded. For example, each of the frequency bands may be a frequency band included within the third frequency range. For example, the at least one coding parameter may include information on a signal that has a strength greater than or equal to the reference strength within a predetermined time interval (e.g., a frame) and has been obtained when the second audio bitstream was coded. For example, the signal may be referred to as a transient signal. For example, the at least one coding parameter may include pitch information and/or harmonic overtone information that has been obtained when the second audio bitstream was coded. However, it is not limited thereto.

In operation 403, the processor 210 may identify at least one another coding parameter obtained from the first audio bitstream. For example, the at least one other coding parameter may include energy information for each of the frequency bands that has been obtained when the first audio bitstream was coded. For example, each of the frequency bands may be a frequency band included within the first frequency range. For example, the at least one coding parameter may include information on a signal (e.g., the transient signal) that has a strength greater than or equal to the reference strength within a predetermined time interval and has been obtained when the first audio bitstream was coded. For example, the at least one coding parameter may include pitch information and/or harmonic overtone that has obtained when the first audio bitstream was coded. However, it is not limited thereto.

In operation 405, the processor 210 may execute a BWE for the first audio bitstream based on the at least one coding parameter and the at least one other coding parameter.

For example, the processor 210 may execute the BWE, by obtaining data in the second frequency range having energy identified based on the energy information of the at least one coding parameter and/or the energy information of the at least one other coding parameter. For example, the processor 210 may obtain the data based on the energy information of at least one frequency band within the second frequency range that has been obtained when the second audio bitstream was coded.

For example, the processor 210 may execute the BWE by obtaining the data including a part that has a strength greater than or equal to the reference strength based on the information on the signal that has a strength greater than equal to the reference strength. For example, when the at least one other coding parameter indicates that a part that has the strength greater than or equal to the reference strength is included in the at least one other coding parameter, the processor 210 may obtain the data by estimating the part based on the information in the at least one coding parameter.

For example, the processor 210 may execute the BWE by obtaining the data based on the pitch information or the harmonic overtone.

As described above, the electronic device 101 may execute the BWE for the first audio bitstream, based on a coding parameter of at least one audio bitstream (e.g., the second audio bitstream) and a coding parameter of the first audio bitstream previously received in the past. The electronic device 101 may provide an enhanced audio service through the execution of the BWE.

Figure 5:
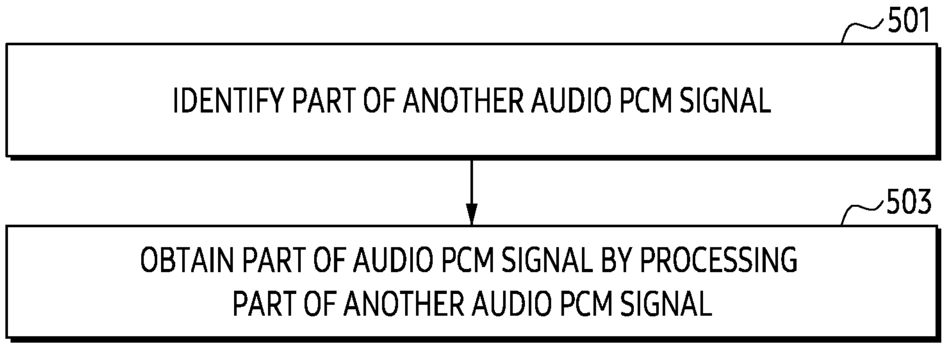
FIG. 5 is a flowchart illustrating a method of processing a part of an audio PCM signal based on a part of another audio PCM signal.

FIG. 5 is a flowchart illustrating a method of processing a part of an audio PCM signal based on a part of another audio PCM signal. The method may be executed by the processor 210 illustrated in FIG. 2.

Operation 501 and operation 503 of FIG. 5 may be included in operation 307 of FIG. 3. However, it is not limited thereto. For example, operation 501 and operation 503 may be executed independently of operation 307 of FIG. 3.

Referring to FIG. 5, in operation 501, the processor 210 may identify a part of another audio PCM signal obtained from the second audio bitstream based on the bitrate of the first audio bitstream lower than the reference value. For example, the part of the other audio PCM signal may overlap a part of the audio PCM signal.

In operation 503, the processor 210 may obtain the part of the audio PCM signal by processing the part of the other audio PCM signal. For example, the processor 210 may obtain the part of the audio PCM signal based on interpolation between the part of the audio PCM signal and the other part of the audio PCM signal, in order to reduce a difference between an audio outputted based on the other audio PCM signal and an audio outputted based on the audio PCM signal. For example, the processor 210 may process a boundary between the audio PCM signal and the other audio PCM signal.

As described above, when the audio PCM signal is obtained by executing the BWE, the electronic device 101 may provide an enhanced audio service by processing the boundary between the audio PCM signal and the other audio PCM signal.

The operations illustrated above may be executed through functional components executed by processor 210.

Figure 6:
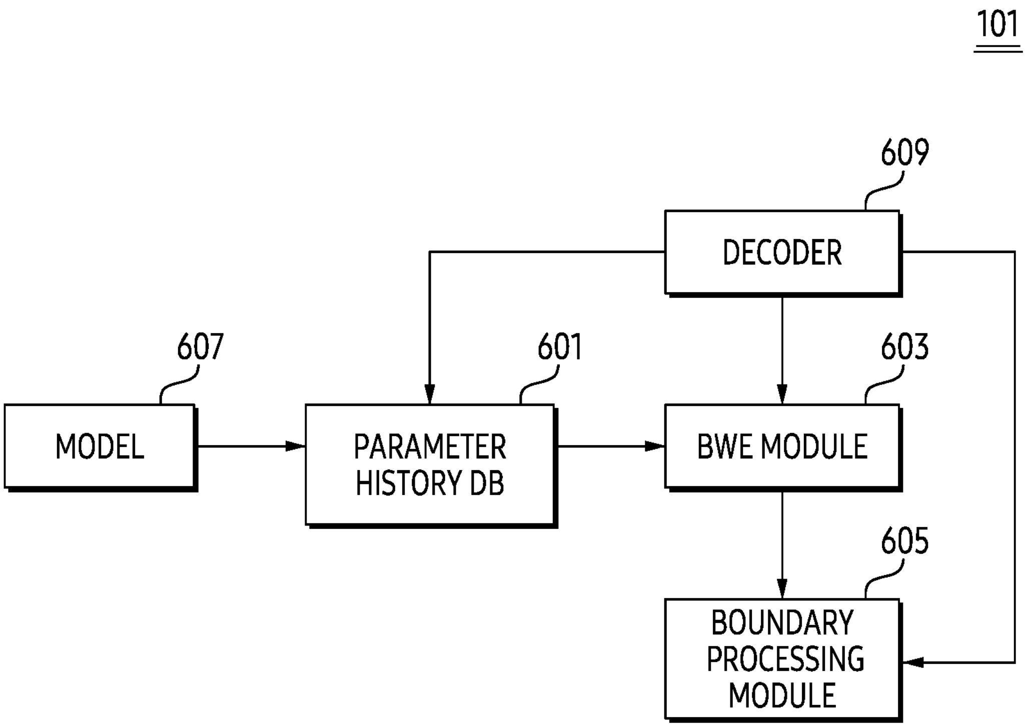
FIGS. 6 and 7 illustrate functional components executed by a processor of an exemplary electronic device.
Figure 7:
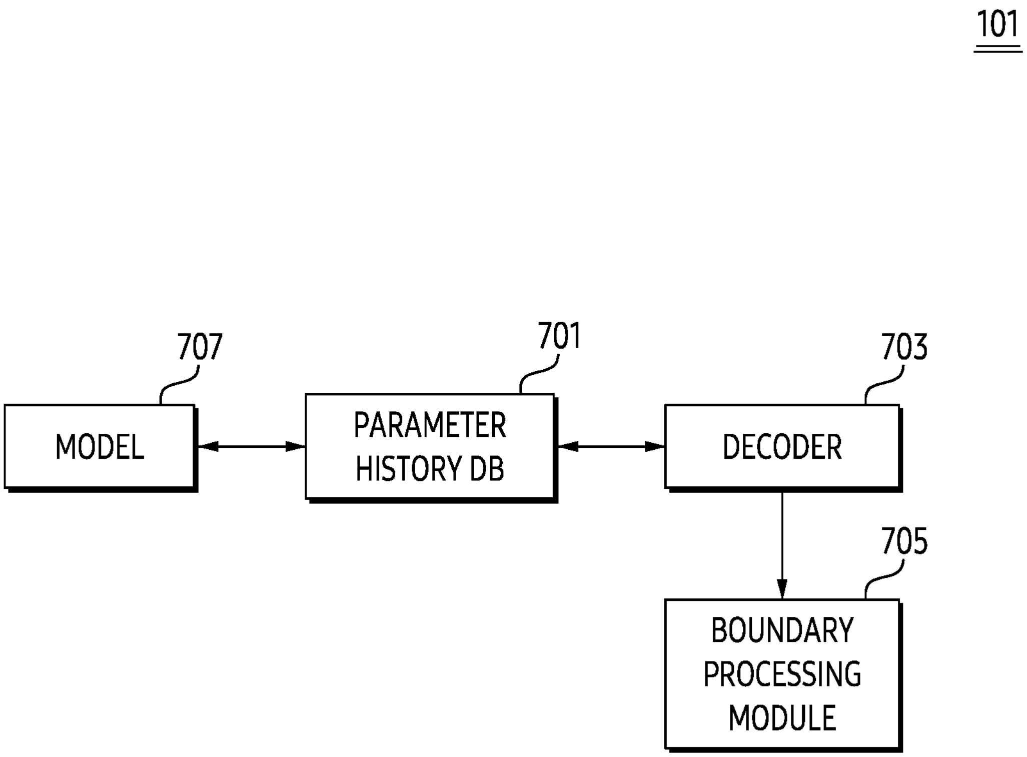

FIGS. 6 and 7 illustrate functional components executed by a processor of an exemplary electronic device.

Referring to FIG. 6, the processor 210 may process an audio bitstream received from the external electronic device 102 by using a decoder 609. For example, the processor 210 may obtain at least one coding parameter used to code the audio bitstream by parsing the audio bitstream. For example, the at least one coding parameter of the second audio bitstream may be provided to a parameter history database 601 (e.g., memory 830 in FIG. 8). For example, the processor 210 may identify that a bitrate of the audio bitstream is lower than the reference value or the bitrate is higher than equal to the reference value, by using. For example, the processor 210 may provide a decoded signal using the decoder 609 to a BWE module 603 based on the bitrate lower than the reference value. For example, the signal provided to BWE module 603 may be a signal on a frequency domain. For example, the processor 210 may provide the decoded signal using the decoder 609 to a boundary processing module 605 based on the bitrate higher than or equal to the reference value. For example, the signal provided to the boundary processing module 605 may be a signal on the time domain.

For example, the processor 210 may execute the BWE for the audio bitstream based on the bitrate lower than the reference value, by using the BWE module 603. For example, the processor 210 may execute the BWE, by using the BWE module 603, based on at least one parameter for the BWE obtained from the parameter history database 601 (e.g., memory 830 in FIG. 8). For example, the at least one parameter for the BWE may be obtained by transforming coding parameters obtained from audio bit streams that were received before the audio bit stream. For example, the at least one parameter for the BWE may be transformed using a model 607 trained through machine learning. For example, the at least one parameter for the BWE may be updated by using the model 607 trained through machine learning. For example, the model 607 may be implemented as software (e.g., the program 840) including one or more instructions that are stored in a storage medium (e.g., internal memory 836 or external memory 838) and operated by the auxiliary processor 823 in FIG. 8.

For example, the processor 210 may transform a signal obtained by executing the BWE using the BWE module 603. For example, the signal may be a signal on a time domain. For example, the signal may be provided to the boundary processing module 605.

For example, the processor 210 may process a boundary of the signal, based on a boundary of another signal obtained before the signal by using the boundary processing module 605. For example, the signal in which the boundary is processed may be used to output audio.

Referring to FIG. 7, the processor 210 may process an audio bitstream received from the external electronic device 102 by using a decoder 703. For example, the processor 210 may obtain at least one coding parameter that was used to code the audio bitstream by parsing the audio bitstream. For example, the at least one coding parameter may be provided to the parameter history database 701 (e.g., memory 830 in FIG. 8). For example, the processor 210 may identify that a bitrate of the audio bitstream obtained based on the parsing is lower than the reference value or that the bitrate is higher than or equal to the reference value, by using the decoder 703.

For example, the processor 210 may use the decoder 703 to transform the audio bitstream into a signal on the frequency domain and use the decoder 703 to execute a BWE for the signal, based on the bitrate lower than the reference value. For example, the processor 210 may execute the BWE by using the decoder 703 based on at least one parameter for the BWE obtained from the parameter history database 701 (e.g., memory 830 in FIG. 8). For example, the at least one parameter for the BWE may be obtained by transforming coding parameters obtained from audio bitstreams received before the audio bitstream. For example, the at least one parameter for the BWE may be transformed by using a model 707 trained through machine learning. For example, the at least one parameter for the BWE may be updated by using the model 707 trained through machine learning. For example, the model 707 may be implemented as software (e.g., the program 840) including one or more instructions that are stored in a storage medium (e.g., internal memory 836 or external memory 838) and operated by the auxiliary processor 823 in FIG. 8. For example, a signal obtained by executing the BWE using a decoder 703 may be transformed into a signal on the time domain. For example, the signal may be provided to the boundary processing module 705.

For example, the processor 210 may transform the audio bitstream into a signal on the time domain by using the decoder 703 based on the bitrate higher than or equal to the reference value. The signal may be provided to the boundary processing module 705.

For example, the processor 210 may process a boundary of the signal using the boundary processing module 705, based on a boundary of another signal obtained before the signal. For example, the signal in which the boundary is processed may be used to output audio.

FIG. 8 is a block diagram illustrating an electronic device 801 in a network environment 800 according to various embodiments. Referring to FIG. 8, the electronic device 801 in the network environment 800 may communicate with an electronic device 802 via a first network 898 (e.g., a short-range wireless communication network), or at least one of an electronic device 804 or a server 808 via a second network 899 (e.g., a long-range wireless communication network). According to an embodiment, the electronic device 801 may communicate with the electronic device 804 via the server 808. According to an embodiment, the electronic device 801 may include a processor 820, memory 830, an input module 850, a sound output module 855, a display module 860, an audio module 870, a sensor module 876, an interface 877, a connecting terminal 878, a haptic module 879, a camera module 880, a power management module 888, a battery 889, a communication module 890, a subscriber identification module (SIM) 896, or an antenna module 897. In some embodiments, at least one of the components (e.g., the connecting terminal 878) may be omitted from the electronic device 801, or one or more other components may be added in the electronic device 801. In some embodiments, some of the components (e.g., the sensor module 876, the camera module 880, or the antenna module 897) may be implemented as a single component (e.g., the display module 860).

The processor 820 may execute, for example, software (e.g., a program 840) to control at least one other component (e.g., a hardware or software component) of the electronic device 801 coupled with the processor 820, and may perform various data processing or computation. According to one embodiment, as at least part of the data processing or computation, the processor 820 may store a command or data received from another component (e.g., the sensor module 876 or the communication module 890) in volatile memory 832, process the command or the data stored in the volatile memory 832, and store resulting data in non-volatile memory 834. According to an embodiment, the processor 820 may include a main processor 821 (e.g., a central processing unit (CPU) or an application processor (AP)), or an auxiliary processor 823 (e.g., a graphics processing unit (GPU), a neural processing unit (NPU), an image signal processor (ISP), a sensor hub processor, or a communication processor (CP)) that is operable independently from, or in conjunction with, the main processor 821. For example, when the electronic device 801 includes the main processor 821 and the auxiliary processor 823, the auxiliary processor 823 may be adapted to consume less power than the main processor 821, or to be specific to a specified function. The auxiliary processor 823 may be implemented as separate from, or as part of the main processor 821.

The auxiliary processor 823 may control at least some of functions or states related to at least one component (e.g., the display module 860, the sensor module 876, or the communication module 890) among the components of the electronic device 801, instead of the main processor 821 while the main processor 821 is in an inactive (e.g., sleep) state, or together with the main processor 821 while the main processor 821 is in an active state (e.g., executing an application). According to an embodiment, the auxiliary processor 823 (e.g., an image signal processor or a communication processor) may be implemented as part of another component (e.g., the camera module 880 or the communication module 890) functionally related to the auxiliary processor 823. According to an embodiment, the auxiliary processor 823 (e.g., the neural processing unit) may include a hardware structure specified for artificial intelligence model processing. An artificial intelligence model may be generated by machine learning. Such learning may be performed, e.g., by the electronic device 801 where the artificial intelligence is performed or via a separate server (e.g., the server 808). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 830 may store various data used by at least one component (e.g., the processor 820 or the sensor module 876) of the electronic device 801. The various data may include, for example, software (e.g., the program 840) and input data or output data for a command related thereto. The memory 830 may include the volatile memory 832 or the non-volatile memory 834.

The program 840 may be stored in the memory 830 as software, and may include, for example, an operating system (OS) 842, middleware 844, or an application 846.

The input module 850 may receive a command or data to be used by another component (e.g., the processor 820) of the electronic device 801, from the outside (e.g., a user) of the electronic device 801. The input module 850 may include, for example, a microphone, a mouse, a keyboard, a key (e.g., a button), or a digital pen (e.g., a stylus pen).

The sound output module 855 may output sound signals to the outside of the electronic device 801. The sound output module 855 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 860 may visually provide information to the outside (e.g., a user) of the electronic device 801. The display module 860 may include, for example, a display, a hologram device, or a projector and control circuitry to control a corresponding one of the display, hologram device, and projector. According to an embodiment, the display module 860 may include a touch sensor adapted to detect a touch, or a pressure sensor adapted to measure the intensity of force incurred by the touch.

The audio module 870 may convert a sound into an electrical signal and vice versa. According to an embodiment, the audio module 870 may obtain the sound via the input module 850, or output the sound via the sound output module 855 or a headphone of an external electronic device (e.g., an electronic device 802) directly (e.g., wiredly) or wirelessly coupled with the electronic device 801.

The sensor module 876 may detect an operational state (e.g., power or temperature) of the electronic device 801 or an environmental state (e.g., a state of a user) external to the electronic device 801, and then generate an electrical signal or data value corresponding to the detected state. According to an embodiment, the sensor module 876 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 877 may support one or more specified protocols to be used for the electronic device 801 to be coupled with the external electronic device (e.g., the electronic device 802) directly (e.g., wiredly) or wirelessly. According to an embodiment, the interface 877 may include, for example, a high definition multimedia interface (HDMI), a universal serial bus (USB) interface, a secure digital (SD) card interface, or an audio interface.

A connecting terminal 878 may include a connector via which the electronic device 801 may be physically connected with the external electronic device (e.g., the electronic device 802). According to an embodiment, the connecting terminal 878 may include, for example, a HDMI connector, a USB connector, a SD card connector, or an audio connector (e.g., a headphone connector).

The haptic module 879 may convert an electrical signal into a mechanical stimulus (e.g., a vibration or a movement) or electrical stimulus which may be recognized by a user via his tactile sensation or kinesthetic sensation. According to an embodiment, the haptic module 879 may include, for example, a motor, a piezoelectric element, or an electric stimulator.

The camera module 880 may capture a still image or moving images. According to an embodiment, the camera module 880 may include one or more lenses, image sensors, image signal processors, or flashes.

The power management module 888 may manage power supplied to the electronic device 801. According to one embodiment, the power management module 888 may be implemented as at least part of, for example, a power management integrated circuit (PMIC).

The battery 889 may supply power to at least one component of the electronic device 801. According to an embodiment, the battery 889 may include, for example, a primary cell which is not rechargeable, a secondary cell which is rechargeable, or a fuel cell.

The communication module 890 may support establishing a direct (e.g., wired) communication channel or a wireless communication channel between the electronic device 801 and the external electronic device (e.g., the electronic device 802, the electronic device 804, or the server 808) and performing communication via the established communication channel. The communication module 890 may include one or more communication processors that are operable independently from the processor 820 (e.g., the application processor (AP)) and supports a direct (e.g., wired) communication or a wireless communication. According to an embodiment, the communication module 890 may include a wireless communication module 892 (e.g., a cellular communication module, a short-range wireless communication module, or a global navigation satellite system (GNSS) communication module) or a wired communication module 894 (e.g., a local area network (LAN) communication module or a power line communication (PLC) module). A corresponding one of these communication modules may communicate with the external electronic device via the first network 898 (e.g., a short-range communication network, such as Bluetooth™, wireless-fidelity (Wi-Fi) direct, or infrared data association (IrDA)) or the second network 899 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 892 may identify and authenticate the electronic device 801 in a communication network, such as the first network 898 or the second network 899, using subscriber information (e.g., international mobile subscriber identity (IMSI)) stored in the subscriber identification module 896.

The wireless communication module 892 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 892 may support a high-frequency band (e.g., the mmWave band) to achieve, e.g., a high data transmission rate. The wireless communication module 892 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 892 may support various requirements specified in the electronic device 801, an external electronic device (e.g., the electronic device 804), or a network system (e.g., the second network 899). According to an embodiment, the wireless communication module 892 may support a peak data rate (e.g., 20 Gbps or more) for implementing eMBB, loss coverage (e.g., 864 dB or less) for implementing mMTC, or U-plane latency (e.g., 0.5 ms or less for each of downlink (DL) and uplink (UL), or a round trip of 8 ms or less) for implementing URLLC.

The antenna module 897 may transmit or receive a signal or power to or from the outside (e.g., the external electronic device) of the electronic device 801. According to an embodiment, the antenna module 897 may include an antenna including a radiating element composed of a conductive material or a conductive pattern formed in or on a substrate (e.g., a printed circuit board (PCB)). According to an embodiment, the antenna module 897 may include a plurality of antennas (e.g., array antennas). In such a case, at least one antenna appropriate for a communication scheme used in the communication network, such as the first network 898 or the second network 899, may be selected, for example, by the communication module 890 (e.g., the wireless communication module 892) from the plurality of antennas. The signal or the power may then be transmitted or received between the communication module 890 and the external electronic device via the selected at least one antenna. According to an embodiment, another component (e.g., a radio frequency integrated circuit (RFIC)) other than the radiating element may be additionally formed as part of the antenna module 897.

According to various embodiments, the antenna module 897 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 801 and the external electronic device 804 via the server 808 coupled with the second network 899. Each of the electronic devices 802 or 804 may be a device of a same type as, or a different type, from the electronic device 801. According to an embodiment, all or some of operations to be executed at the electronic device 801 may be executed at one or more of the external electronic devices 802, 804, or 808. For example, if the electronic device 801 should perform a function or a service automatically, or in response to a request from a user or another device, the electronic device 801, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 801. The electronic device 801 may provide the outcome, with or without further processing of the outcome, as at least part of a reply to the request. To that end, a cloud computing, distributed computing, mobile edge computing (MEC), or client-server computing technology may be used, for example. The electronic device 801 may provide ultra low-latency services using, e.g., distributed computing or mobile edge computing. In another embodiment, the external electronic device 804 may include an internet-of-things (IoT) device. The server 808 may be an intelligent server using machine learning and/or a neural network. According to an embodiment, the external electronic device 804 or the server 808 may be included in the second network 899. The electronic device 801 may be applied to intelligent services (e.g., smart home, smart city, smart car, or healthcare) based on 5G communication technology or IoT-related technology.

FIG. 9 is a block diagram 900 illustrating the audio module 870 according to various embodiments. Referring to FIG. 9, the audio module 870 may include, for example, an audio input interface 910, an audio input mixer 920, an analog-to-digital converter (ADC) 930, an audio signal processor 940, a digital-to-analog converter (DAC) 950, an audio output mixer 960, or an audio output interface 970.

The audio input interface 910 may receive an audio signal corresponding to a sound obtained from the outside of the electronic device 801 via a microphone (e.g., a dynamic microphone, a condenser microphone, or a piezo microphone) that is configured as part of the input module 850 or separately from the electronic device 801. For example, if an audio signal is obtained from the external electronic device 802 (e.g., a headset or a microphone), the audio input interface 910 may be connected with the external electronic device 802 directly via the connecting terminal 878, or wirelessly (e.g., Bluetooth™ communication) via the wireless communication module 892 to receive the audio signal. According to an embodiment, the audio input interface 910 may receive a control signal (e.g., a volume adjustment signal received via an input button) related to the audio signal obtained from the external electronic device 802. The audio input interface 910 may include a plurality of audio input channels and may receive a different audio signal via a corresponding one of the plurality of audio input channels, respectively. According to an embodiment, additionally or alternatively, the audio input interface 910 may receive an audio signal from another component (e.g., the processor 820 or the memory 830) of the electronic device 801.

The audio input mixer 920 may synthesize a plurality of inputted audio signals into at least one audio signal. For example, according to an embodiment, the audio input mixer 920 may synthesize a plurality of analog audio signals inputted via the audio input interface 910 into at least one analog audio signal.

The ADC 930 may convert an analog audio signal into a digital audio signal. For example, according to an embodiment, the ADC 930 may convert an analog audio signal received via the audio input interface 910 or, additionally or alternatively, an analog audio signal synthesized via the audio input mixer 920 into a digital audio signal.

The audio signal processor 940 may perform various processing on a digital audio signal received via the ADC 930 or a digital audio signal received from another component of the electronic device 801. For example, according to an embodiment, the audio signal processor 940 may perform changing a sampling rate, applying one or more filters, interpolation processing, amplifying or attenuating a whole or partial frequency bandwidth, noise processing (e.g., attenuating noise or echoes), changing channels (e.g., switching between mono and stereo), mixing, or extracting a specified signal for one or more digital audio signals. According to an embodiment, one or more functions of the audio signal processor 940 may be implemented in the form of an equalizer.

The DAC 950 may convert a digital audio signal into an analog audio signal. For example, according to an embodiment, the DAC 950 may convert a digital audio signal processed by the audio signal processor 940 or a digital audio signal obtained from another component (e.g., the processor (820) or the memory (830)) of the electronic device 801 into an analog audio signal.

The audio output mixer 960 may synthesize a plurality of audio signals, which are to be outputted, into at least one audio signal. For example, according to an embodiment, the audio output mixer 960 may synthesize an analog audio signal converted by the DAC 950 and another analog audio signal (e.g., an analog audio signal received via the audio input interface 910) into at least one analog audio signal.

The audio output interface 970 may output an analog audio signal converted by the DAC 950 or, additionally or alternatively, an analog audio signal synthesized by the audio output mixer 960 to the outside of the electronic device 801 via the sound output module 855. The sound output module 855 may include, for example, a speaker, such as a dynamic driver or a balanced armature driver, or a receiver. According to an embodiment, the sound output module 855 may include a plurality of speakers. In such a case, the audio output interface 970 may output audio signals having a plurality of different channels (e.g., stereo channels or 5.1 channels) via at least some of the plurality of speakers. According to an embodiment, the audio output interface 970 may be connected with the external electronic device 802 (e.g., an external speaker or a headset) directly via the connecting terminal 878 or wirelessly via the wireless communication module 892 to output an audio signal.

According to an embodiment, the audio module 870 may generate, without separately including the audio input mixer 920 or the audio output mixer 960, at least one digital audio signal by synthesizing a plurality of digital audio signals using at least one function of the audio signal processor 940.

According to an embodiment, the audio module 870 may include an audio amplifier (not shown) (e.g., a speaker amplifying circuit) that is capable of amplifying an analog audio signal inputted via the audio input interface 910 or an audio signal that is to be outputted via the audio output interface 970. According to an embodiment, the audio amplifier may be configured as a module separate from the audio module 870.

As described above, an electronic device 101 may include a communication circuit 230, a speaker 240, and a processor 210. According to an embodiment, the processor 210 may be configured to identify a bitrate of a first audio bitstream received via the communication circuit 230 from an external electronic device 102. According to an embodiment, the processor 210 may be configured to obtain, in response to the bitrate lower than a reference value, an audio signal based on executing a bandwidth extension (BWE) for the first audio bitstream based at least in part on at least one coding parameter obtained from a second audio bitstream that has been received via the communication circuit 230 from the external electronic device 102 before the first audio bitstream. According to an embodiment, the processor 210 may be configured to obtain, in response to the bitrate higher than or equal to the reference value, obtain the audio signal based on bypassing to execute the BWE. According to an embodiment, the processor 210 may be configured to output, based on the audio signal, audio via the speaker.

According to an embodiment, the second audio bitstream may be a bitstream obtained based on coding a signal on a first frequency range lower than a reference frequency and a second frequency range higher than or equal to the reference frequency in the external electronic device 102. According to an embodiment, the first audio bitstream having the bitrate lower than the reference value may be a bitstream obtained based on coding a signal on the first frequency range among the first frequency range and the second frequency range in the external electronic device 102. According to an embodiment, the first audio bitstream having the bitrate higher than or equal to the reference value may be a bitstream based on coding a signal on the first frequency range and the second frequency range in the external electronic device 102.

According to an embodiment, the at least one coding parameter may include energy information for each of frequency bands that has been obtained when the second audio bitstream was encoded. According to an embodiment, the processor may be configured to execute the BWE by obtaining data on the second frequency range that has an energy identified based on the energy information.

According to an embodiment, the at least one coding parameter may include information for a signal that has a strength greater than or equal to a reference strength within a predetermined time interval and has been obtained when the second bitstream was encoded. According to an embodiment, the processor 210 may be configured to execute the BWE by obtaining the data including a portion having a strength greater than or equal to the reference strength within the predetermined time interval, based on the information.

According to an embodiment, the at least one coding parameter may include pitch information or harmonic overtone information that has been obtained when the second bitstream was encoded. According to an embodiment, the processor 210 may be configured to execute the BWE by obtaining the data based on the pitch information or the harmonic overtone information.

According to an embodiment, the processor 210 may be configured to obtain a signal on a frequency domain by executing an inverse quantization for the first audio bitstream. According to an embodiment, the processor 210 may be configured to execute the BWE with respect to the signal on the frequency domain.

According to an embodiment, the processor 210 may be configured to obtain the audio signal by executing an inverse transform for a signal on a frequency domain obtained through the BWE.

According to an embodiment, the at least one coding parameter may be converted to at least one parameter for the BWE.

According to an embodiment, the at least one parameter may be converted using a trained model.

According to an embodiment, the processor 210 may be configured to obtain another audio signal from the second audio bitstream. According to an embodiment, a part of the audio signal may be obtained by processing a part of the other audio signal that is overlapped with the part of the audio signal.

As described above, a method executed in an electronic device 101 including a communication circuit 230 and a speaker 240 may comprise identifying a bitrate of a first audio bitstream received via the communication circuit 230 from an external electronic device. According to an embodiment, the method may comprise obtaining, in response to the bitrate lower than a reference value, an audio signal based on executing a bandwidth extension (BWE) for the first audio bitstream based at least in part on at least one coding parameter obtained from a second audio bitstream that has been received via the communication circuit 230 from the external electronic device before the first audio bitstream. According to an embodiment, the method may comprise obtaining, in response to the bitrate higher than or equal to the reference value, obtain the audio signal based on bypassing to execute the BWE. According to an embodiment, the method may comprise outputting, based on the audio signal, audio via the speaker 240.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 840) including one or more instructions that are stored in a storage medium (e.g., internal memory 836 or external memory 838) that is readable by a machine (e.g., the electronic device 801). For example, a processor (e.g., the processor 820) of the machine (e.g., the electronic device 801) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:

communication circuitry;

a speaker;

memory storing one or more instructions; and at least one processor comprising processing circuitry, wherein the instructions, when executed by the at least one processor, cause the electronic device to:

identify a bitrate of a first audio bitstream received via the communication circuitry from an external electronic device;

in response to the bitrate being identified as lower than a bitrate threshold:

obtain a first audio signal by executing a bandwidth extension (BWE) for the first audio bitstream using at least one coding parameter obtained from a second audio bitstream received via the communication circuitry from the external electronic device before the first audio bitstream, wherein the first audio bitstream having the bitrate lower than the bitrate threshold is a bitstream obtained by coding a signal in a first frequency range lower than a reference frequency in the external electronic device, and wherein the second audio bitstream is obtained from a signal both in the first frequency range and a second frequency range higher than the reference frequency in the external electronic device, and output audio via the speaker using the first audio signal; and in response to the bitrate being identified as higher than the bitrate threshold:

obtain a second audio signal by bypassing to execute the BWE, wherein the first audio bitstream having the bitrate higher than the bitrate threshold is a bit stream obtained by coding a signal both in the first frequency range and the second frequency range in the external electronic device; and output audio via the speaker using the second audio signal.

2. The electronic device of claim 1, wherein the instructions, when executed by the at least one processor, cause the electronic device to:

in response to the bitrate being identified as higher than the bitrate threshold, obtain at least one another coding parameter from the first audio bitstream for executing the BWE for a third audio bitstream to be received via the communication circuitry from the external electronic device after the first audio bitstream.

3. The electronic device of claim 2, wherein the instructions, when executed by the at least one processor, cause the electronic device to:

in response to the bitrate being identified as lower than the bitrate threshold, obtain the first audio signal using energy information for each of frequency bands obtained by encoding the second audio bitstream.

4. The electronic device of claim 3, wherein the instructions, when executed by the at least one processor, cause the electronic device to:

in response to the bitrate being identified as lower than the bitrate threshold, obtain the first audio signal using information for a signal, having a strength greater than a reference strength within a predetermined time interval, obtained by encoding the second bitstream.

5. The electronic device of claim 1, wherein the instructions, when executed by the at least one processor, cause the electronic device to:

in response to the bitrate being identified as lower than the bitrate threshold, obtain the first audio signal using pitch information or harmonic overtone information that has been obtained when the second bitstream was encoded.

6. The electronic device of claim 2, wherein the instructions, when executed by the at least one processor, cause the electronic device to:

in response to the bitrate being identified as lower than the bitrate threshold:

obtain a signal on a frequency domain by executing an inverse quantization for the first audio bitstream; and execute the BWE with respect to the signal on the frequency domain.

7. The electronic device of claim 2, wherein the instructions, when executed by the at least one processor, cause the electronic device to:

in response to the bitrate being identified as lower than the bitrate threshold, obtain the first audio signal by executing an inverse transform for a signal on a frequency domain obtained through the BWE.

8. The electronic device of claim 2, wherein the instructions, when executed by the at least one processor, cause the electronic device to:

in response to the bitrate being identified as lower than the bitrate threshold, obtain the first audio signal further using a parameter converted to at least one parameter for the BWE.

9. The electronic device of claim 8,
wherein the at least one parameter is converted using a trained model.

10. The electronic device of claim 2,
wherein the instructions, when executed by the at least one processor, cause the electronic device to:
obtain a third audio signal from the second audio bitstream,
wherein a part of the first audio signal is obtained by processing a part of the third audio signal that is overlapped with the part of the first audio signal.

11. The electronic device of claim 1,
wherein the instructions, when executed by the at least one processor, cause the electronic device to:
in response to the bitrate being identified as lower than a bitrate threshold:
obtain the first audio signal by executing the BWE for the first audio bitstream further using at least one coding parameter obtained from the first audio bitstream, and
output audio via the speaker using the first audio signal.

12. A method executed in an electronic device including a communication circuitry and a speaker, the method comprising:
identifying a bitrate of a first audio bitstream received via the communication circuitry from an external electronic device;
in response to the bitrate being identified as lower than a bitrate threshold:
obtaining a first audio signal by executing a bandwidth extension (BWE) for the first audio bitstream using at least one coding parameter obtained from a second audio bitstream received via the communication circuitry from the external electronic device before the first audio bitstream, wherein the first audio bitstream having the bitrate lower than the bitrate threshold is a bitstream obtained by coding a signal on a first frequency range lower than a reference frequency in the external electronic device, and wherein the second audio bitstream is obtained from a signal both in the first frequency range and a second frequency range higher than the reference frequency in the external electronic device, and
outputting audio via the speaker using the first audio signal; and
in response to the bitrate being identified as higher than the bitrate threshold:
obtaining a second audio signal by bypassing to execute the BWE, wherein the first audio bitstream having the bitrate higher than the bitrate threshold is a bitstream obtained by coding a signal both in the first frequency range and the second frequency range in the external electronic device; and
outputting audio via the speaker using the second audio signal.

13. The method of claim 12, comprising:
in response to the bitrate being identified as higher than the bitrate threshold, obtaining at least one another coding parameter from the first audio bitstream for executing the BWE for a third audio bitstream to be received via the communication circuitry from the external electronic device after the first audio bitstream.

14. The method of claim 12, comprising:
in response to the bitrate being identified as lower than the bitrate threshold, obtaining the first audio signal using energy information for each of frequency bands obtained by encoding the second audio bitstream.

15. The method of claim 12, comprising:
wherein the instructions, when executed by the at least one processor, cause the electronic device to:
in response to the bitrate being identified as lower than the bitrate threshold, obtaining the first audio signal using information for a signal, having a strength greater than a reference strength within a predetermined time interval, obtained by encoding the second bitstream.

16. The method of claim 12, comprising:
in response to the bitrate being identified as lower than the bitrate threshold, obtaining the first audio signal using pitch information or harmonic overtone information that has been obtained when the second bitstream was encoded.

17. The method of claim 12, comprising:
in response to the bitrate being identified as lower than the bitrate threshold:
obtaining a signal on a frequency domain by executing an inverse quantization for the first audio bitstream; and
executing the BWE with respect to the signal on the frequency domain.

18. The method of claim 12, comprising:
wherein the instructions, when executed by the at least one processor, cause the electronic device to:
in response to the bitrate being identified as lower than the bitrate threshold, obtaining the first audio signal by executing an inverse transform for a signal on a frequency domain obtained through the BWE.

19. The method of claim 12, comprising:
in response to the bitrate being identified as lower than the bitrate threshold, obtaining the first audio signal further using a coding parameter converted to at least one parameter for the BWE.

20. The method of claim 19,
wherein the at least one parameter is converted using a trained model.

* * * * *